United States Patent [19]

Helms

[11] Patent Number: 5,561,710
[45] Date of Patent: Oct. 1, 1996

[54] INTERACTIVE VOICE COMMUNICATION TERMINAL WITH ALPHA AND NUMERIC KEYPAD

[76] Inventor: Ramon E. Helms, 2605 Sherrill Park Dr., Richardson, Tex. 75082

[21] Appl. No.: 454,011

[22] Filed: May 30, 1995

Related U.S. Application Data

[63] Continuation of Ser. No. 977,551, Nov. 17, 1992, abandoned.

[51] Int. Cl.⁶ .................................................. H04M 11/00
[52] U.S. Cl. .......................... 379/97; 379/96; 379/442; 379/77; 379/443; 379/99; 379/444; 379/67; 379/52
[58] Field of Search .............................. 379/99, 97, 443, 379/433, 444, 88, 104, 96, 52, 67, 98, 63, 355, 356, 94, 142, 201, 216, 386, 100, 442, 357, 77, 89

[56] References Cited

U.S. PATENT DOCUMENTS

| | | | |
|---|---|---|---|
| 3,619,507 | 11/1971 | Metz | 379/444 |
| 4,126,768 | 11/1978 | Grenzow | 379/357 |
| 4,201,887 | 5/1980 | Burns | 379/96 |
| 4,252,996 | 2/1981 | D'Agostino | 379/443 |
| 4,268,721 | 5/1981 | Nielson et al. | 379/52 |
| 4,307,266 | 12/1981 | Messina | 379/88 |
| 4,367,374 | 1/1983 | Serrano | 379/442 |
| 4,471,165 | 9/1984 | DeFino et al. | 379/99 |
| 4,503,288 | 3/1985 | Kessler | 379/67 |
| 4,682,957 | 7/1987 | Young | 379/77 |
| 4,754,474 | 6/1988 | Feinson | 379/96 |
| 4,799,254 | 1/1989 | Dayton et al. | 379/97 |
| 4,817,129 | 3/1989 | Riskin | 379/88 |
| 4,907,267 | 3/1990 | Gutzmer | 379/442 |
| 4,918,721 | 4/1990 | Hashimoto | 379/96 |
| 5,249,220 | 9/1993 | Moskowitz et al. | 379/96 |
| 5,289,521 | 2/1994 | Coleman et al. | 379/97 |

OTHER PUBLICATIONS

GE, "Use and Care Guide", Model 2–9375, pp. 1–9 & Back Cover.

*Primary Examiner*—Krista M. Zele
*Assistant Examiner*—Scott Wolinsky
*Attorney, Agent, or Firm*—Gregory M. Howison

[57] ABSTRACT

An interactive voice communication terminal (10) provides alpha and numeric characters transmitted from a DTMF generator (36) to access a database by interfacing with the mouthpiece (24) of a telephone handset (26) via a transducer (22). A keypad (14) is operable to allow selection of one of multiple characters associated with alpha characters and numeric characters. A table of DTMF strings associated with each key is stored in a memory (34). In response to depression of a key on the keypad (14), a centralized controller (32) controls the DTMF generator (36) to output the sequence associated with the depressed key that was stored in the memory (34) to transducer (22) via a driver (38). The tables in the memory (34) can be a combination of DTMF sequences for alpha characters and single number sequences for numerical sequences or they can be fixed-length sequences for all numerical and alpha characters. Further, a Learn mode is provided for allowing the user to program the DTMF sequence for a given key on the keypad (14).

22 Claims, 4 Drawing Sheets

INTERACTIVE VOICE COMMUNICATION TERMINAL WITH ALPHA AND NUMERIC KEYPAD

This application is a Continuation, of application Ser. No. 07/977,551, filed Nov. 17, 1992, now abandoned.

TECHNICAL FIELD OF THE INVENTION

The present invention pertains in general to communication systems for communicating with databases and, more particularly, to a portable communication terminal for communicating through a standard telephone interface with a database utilizing conventionally available DTMF digits to reproduce both alpha and numeric characters.

BACKGROUND OF THE INVENTION

Communication systems for interfacing with databases have evolved from direct terminal interconnects to systems that communicate through the phone lines via modems, touchtone keypads, etc. In the early years of database communications, a dedicated terminal of some type was required in order to access the database and provide an interconnect thereto for transfer of data in both directions. With the advent of personal computers and modems, various communication software could be utilized to allow access to these databases by a large number of subscribers or users. However, these systems were somewhat restrictive in that they required a computer and access to a phone line, which significantly reduced mobility. Even the use of notebook computers did not significantly increase the mobility of the user when accessing the database since these systems typically require the computer to be set up, programs loaded therein and then access to the database obtained.

In order to increase the mobility of the user, voice prompt and key prompt systems were developed to allow a user to access various databases. For example, voice prompt systems were developed that required the user to enter simple numbers or letters into a phone after dialing the number of the database. These type of systems are restricted to relatively simple access. For more sophisticated systems that require entry of alpha numeric data, one solution to this problem has been to provide a decoder at the database location that can decipher "double hit" keys on a DTMF keypad, wherein a letter is defined as being more than one key depression. For example, the numeric key "2" on a conventional telephone keypad has associated therewith the letters "A", "B" and "C". To select the letter "A" would require depression of the "2" key followed by depression of the "1" key. Selection of the "C" would require depression of the "2" key followed by depression of the "3" key. This is a workable situation, but is somewhat unwieldy in that the user must keep track of the keystrokes. However, some verbal feedback is provided to make the system slightly more user friendly.

Another system provided for communicating with the database is that disclosed in U.S. Pat. No. 4,799,254, issued Jan. 7, 1989 to D. C. Dayton, et al. The Dayton system provides a small data terminal that has a speaker acoustically coupled to the telephone mouthpiece. After a dial-up connection to a central database, a stored message is recalled and transmitted to the database location in the form of sequential pairs of standard DTMF tones. However, this system does not allow access in conjunction with an interactive database, nor does it utilize conventional DTMF tones that are 100% compatible with conventional telephone systems and keypads.

SUMMARY OF THE INVENTION

The present invention disclosed and claimed herein comprises a communication device for communicating with an interactive voice services system through a telephone system. The communication device includes a keypad having a plurality of depressible keys, each of the depressible keys associated with a character. A memory is operable to store a lookup table that defines a predetermined sequence of DTMF tones for each of the keys and its associated character. The DTMF tones are restricted to the set of DTMF tones generated by the numeric keypad utilized with the telephone. A DTMF generator is operable to generate DTMF tones and drive a transducer to generate acoustic waves corresponding thereto. An acoustic coupler couples the transducer to the telephone without inhibiting a user from speaking into the mouthpiece associated with the telephone. The controller is operable in response to the depression of one of the keys on the keypad to access the corresponding sequence of DTMF tones stored in the memory and control the DTMF generator to drive the transducer with the accessed sequence of DTMF tones.

In another aspect of the present invention, a display is provided for displaying the characters associated with the one of the keys that is depressed. Upon depression of the key, the controller is operable to immediately generate the DTMF tones and display the associated character. The keypad is divided into two portions, an alpha-portion and a numeric-portion. The alpha-portion is associated with the characters of the alphabet and the numeric-portion is associated with the characters on the numeric keypad of the telephone.

In a further aspect of the present invention, the memory is operable to store a plurality of lookup tables. Select ones of the keys on the keypad are utilized to select one of the lookup tables. Depression of the select keys is recognized by the controller which, in response thereto, then selects the associated one of the lookup tables for use by the controller in the DTMF tone generation operation.

In a yet further aspect of the present invention, an additional lookup table can be created in response to depression of select ones of keys on the keypad. A dedicated key is provided on the keypad which is operable to initiate a learn mode. Thereafter, one of the keys on the keypad is depressed followed by the depression of select ones of the keys in the numeric portion in a predetermined and desired sequence. The learn mode is terminated by again depressing a select one of the keys and the sequence then stored in the lookup table as a replacement.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
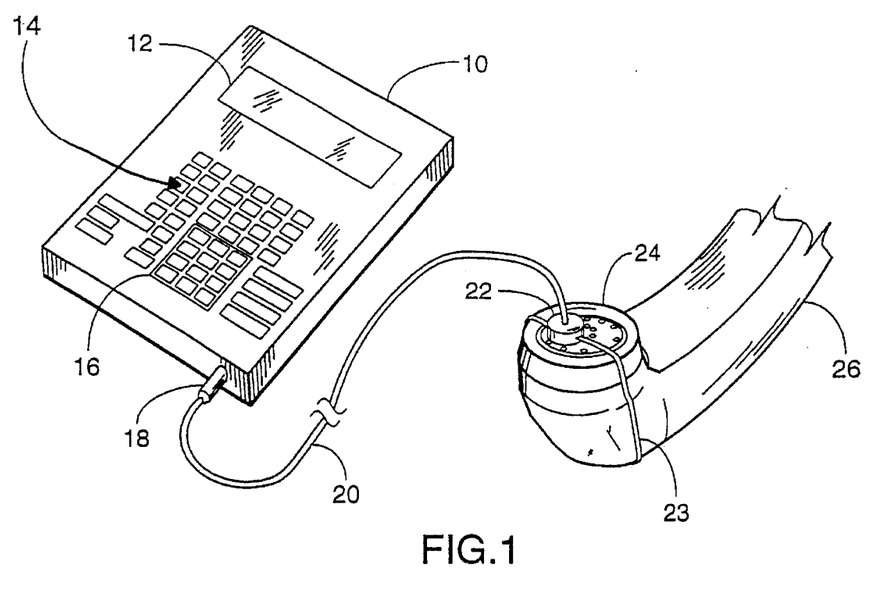
FIG. 1 illustrates a perspective view of the interactive voice communications terminal utilized in conjunction with a telephone handset.

Referring now to FIG. 1, there is illustrated a perspective view of the communication terminal of the present invention. The interactive voice communications terminal 10 is comprised of a case that has associated therewith a display 12 and a keypad 14. The keypad 14 is generally comprised of alpha-numeric keys with a portion of the keys dedicated to alpha characters and a portion 16 dedicated to numeric characters, the portion 16 identical to the keypad on a conventional telephone; that is, it incorporates a twelve button keypad for the numbers "1" through "0" and including the characters "*" and "#".

A connector 18 is provided that is inserted into a jack (not shown) in the case of communications terminal 10. The connector 18 is connected to an audio cable 20, which audio cable is a shielded cable, to a transducer 22. The transducer 22 is disposed on a mouthpiece 24 of a telephone handset 26 with an elastic band 23.

In operation, the communications terminal of the present invention allows for interactive use with the telephone handset; that is, the user can dial up a database system and interact with that system by both voice and alpha-numeric characters. The communications terminal allows the user to enter alpha characters and numeric characters through the transducer 22 merely by depressing the appropriate button. Further, special characters such as ones relating to "yes" and "no" instructions are also provided. For example, a user may dial-up a database that requires both voice response for storage therein and the entry of various information through the alpha-numeric keypad on the communication terminal. By utilizing the transducer 22 in such a manner to allow the user to speak into the mouthpiece 24 and also to allow characters to be input through the mouthpiece 24 in a conventional DTMF format, an interactive interface is provided.

Figure 2:
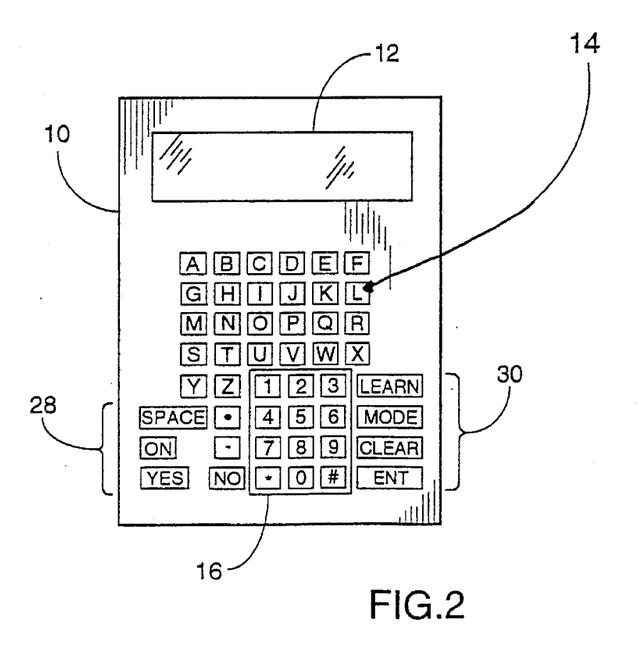
FIG. 2 illustrates a top view of the communications terminal.

Referring now to FIG. 2, there is illustrated a top view of the communications terminal 10. The keys on the keypad 14 are laid out such that the upper portion of the keypad 14 is dedicated to alpha characters. The portion 16 is disposed at the lower righthand side of the keypad and is dedicated to the twelve button conventional numeric keypad layout on a conventional telephone. A number of special characters are located at the left side, with six keys 28. They are the keys to turn the system on, two keys to allow the entry of a "yes" or a "no" prompt, a SPACE key to enter a space in an alpha string and a "." and a "-" key. A set of special function keys 30 are provided on the right side of the numeric keypad 16 to provide for a LEARN, a MODE function, a CLEAR function and an ENTER function.

Figure 3:
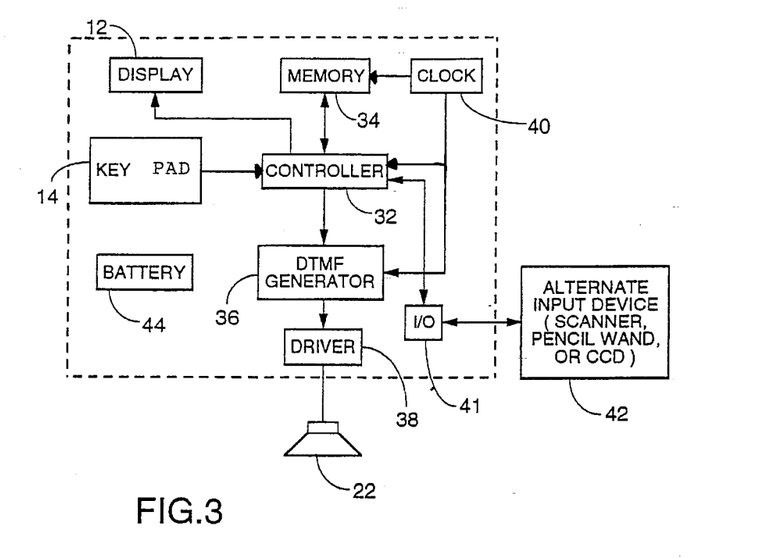
FIG. 3 illustrates a block diagram of the communications terminal.

Referring now to FIG. 3, there is illustrated a block diagram of the communications terminal 10. A controller 32 is provided that is a microcontroller for generating various control signals and interfacing with the keypad 14 and with the display 12. Display 12, in the preferred embodiment, is a Liquid Crystal Display (LCD) with the controller 32 having the appropriate driver associated therewith. The controller 32 interfaces with a memory 34, which memory 34 can be comprised of both a volatile and non-volatile memory. The volatile memory is typically of the type utilizing Dynamic Random Access Memory (DRAM), which provides the memory for storage of the general database. However, since this memory is volatile, it requires power to retain the data therein. The non-volatile portion of the memory is typically comprised of Read Only Memory (ROM), Electrically Erasable Programmable Read Only Memory (EEPROM) or Programmable Read Only Memory (PROM). This memory is typically utilized to store program information, necessary operational parameters, etc., which is utilized in the running of the controller 32.

The controller 32 interfaces with a Dual-Tone Multi-Frequency (DTMF) generator 36 which is operable to generate standard DTMF tones that have a sequence corresponding to predetermined numeric characters, as will be described hereinbelow. The output of the DTMF generator 36 is input to a driver 38, which is operable to drive the transducer 22. An internal clock 40 is provided which provides timing for operation of the controller 32, the memory 34 and the DTMF generator 36. The entire system is powered by a battery 44 or some type of power source.

In operation, the controller 32 operates in a standby mode to minimize the amount of current drain on the battery 44. In this mode, the display 12 is typically powered down and, alternatively, the volatile portion of the memory 34 powered down. Since the volatile portion of the memory utilizes DRAMs, the current drain on the battery 44 is relatively high during operation. Since it is seldom necessary to store data or information when the system is off, this portion of the memory can be powered down. Typically, the DRAM portion of the memory is utilized for buffers, registers, etc. for temporarily storing data utilized during the operational mode of the controller 32. The DTMF generator 36 is also powered down such that only portions of the controller 32 necessary to interact with the keypad 14 are operational. When the keypad 14 has the "on" key depressed, the controller powers everything up and initializes all registers to prepare for the next keystroke.

In order to enter a keystroke, a key is depressed and the controller 34 then determines which sequence of DTMF tones need to be generated by the DTMF generator 36. Typically, the controller 32 searches a lookup table in the non-volatile portion of the memory 34 to determine this. It then controls the DTMF generator 36 to generate the appropriate sequence of tones for output to the transducer 22.

The controller 32 is also interfaced with an input/output (I/O) device 41 that allows the controller to interface with systems other than the keypad 14. An alternate input device 42 is illustrated, which alternate input device 42 comprises a laser scanner, a Charge Couple Device (CCD) or a pencil wand. The system could also include a bar code scanner that would allow an individual to scan bar codes. The important aspect is that the input that is received by the I/O 41 is received by the controller 32 and converted into DTMF-coded tones that correspond to the tones associated with the lookup table stored in the memory 34. Further, when the input is received, the only buffering that occurs is that necessary to account for the speed of transmission by the DTMF generation device 36 and the speed of input by the alternate input device 42. For example, if the alternate input device 42 were a bar code scanner, the individual would scan across a bar code and this information would immediately be converted to a serial data stream, such as an RS 232 stream, and then input to the controller 32. The controller 32 would then process the data in a conventional manner and output it in a temporarily buffered manner in a first in, first out format. Therefore, the DTMF generator 36 would be operable to receive the processed data from the controller 32 and output it in as expedient a manner as possible, in accordance with the constraints placed on standard DTMF transfer on a conventional phone line.

With respect to the interactive aspect of the above example, a user could be placed in a situation wherein he would contact a database and receive a response from the database that it was ready to receive a scanned code. The code would be scanned in and transferred in accordance with the DTMF-coded characters in the lookup table and then a response transmitted back to the user through the earpiece that the code was received. Of course, the lookup table could have special characters indicating the beginning of a bar code and the end of a bar code. In this mode, the user would have a special key on the keypad 14 that would allow the user to enter a bar code mode, with all information from the bar code reader being processed through a separate lookup table. Further, the user could utilize a combination of bar code and alpha characters.

Figure 4:
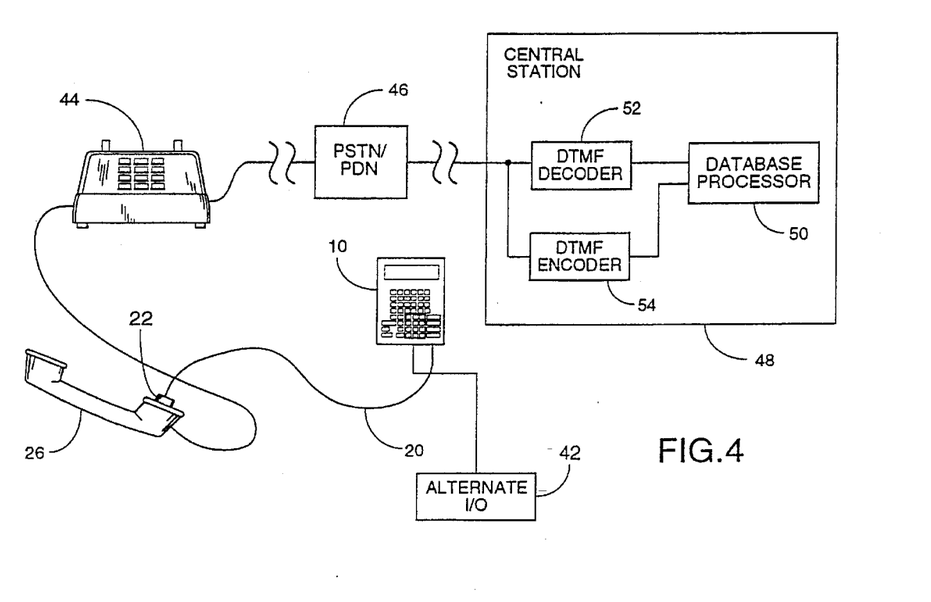
FIG. 4 illustrates a block diagram of the interconnection between the communications terminal, the telephone system and the central station.

Referring now to FIG. 4, there is illustrated a diagrammatic view of the overall system utilizing the communications terminal 10. The communication terminal is connected with the transducer 22 to the mouthpiece on the handset, 26, as described above. The handset 26 is connected to a phone base 44, which is in turn connected to a public switched telephone network/public data network (PSTN/PDN) 46. The PSTN/PDN 46 is, in turn, connected to a central station 48, which central station 48 provides database services. The central station 48 has associated therewith a database processor 50 which has associated therewith processing capabilities and memory for storing or interfacing with the database. Additionally, the central station 48 includes a conventional DTMF decoder 52 and a DTMF encoder 54, this being a conventional operation. In general, the DTMF decoder 52 is operable to recognize the DTMF tones that are generated by a conventional twelve-key keypad on a telephone. However, there are four DTMF tones other than those that are generated by a conventional DTMF keypad. Typically, a normal, DTMF decoder will not recognize these tones as they are out of the ordinary. Although it will decode them, typical systems are not set up to recognize the output as a valid tone.

In operation, a user utilizes the telephone to access the central station 48 through the PSTN/PDN 46. This can be achieved in two ways. First, the keypad associated with the phone base 44 or the handset 26 can be used to dial the appropriate set of digits associated with the phone number of the central station 48. However, this number could also be dialed utilizing the numeric portion 16 of the keypad 14. The user then awaits for a connection with the central station 48, which connection can be indicated by a series of tones, a voice message, etc. Typically, instructions are provided to the user in the form of prompts and then the user will respond to these prompts, which prompts could either require a number to be input through the numeric portion 16 of the keypad 14 or alpha characters input thereto. In accordance with the present invention, as will be described in more detail hereinbelow, each of the alpha characters is coded as a series of conventional DTMF tones which are recognized by the database processor 50 in the central station 48. However, the user is allowed to input the tones and also be provided a voice interface with a telephone, thus rendering the system completely interactive. Additionally, each alpha character is transmitted when it is generated.

Figure 5:
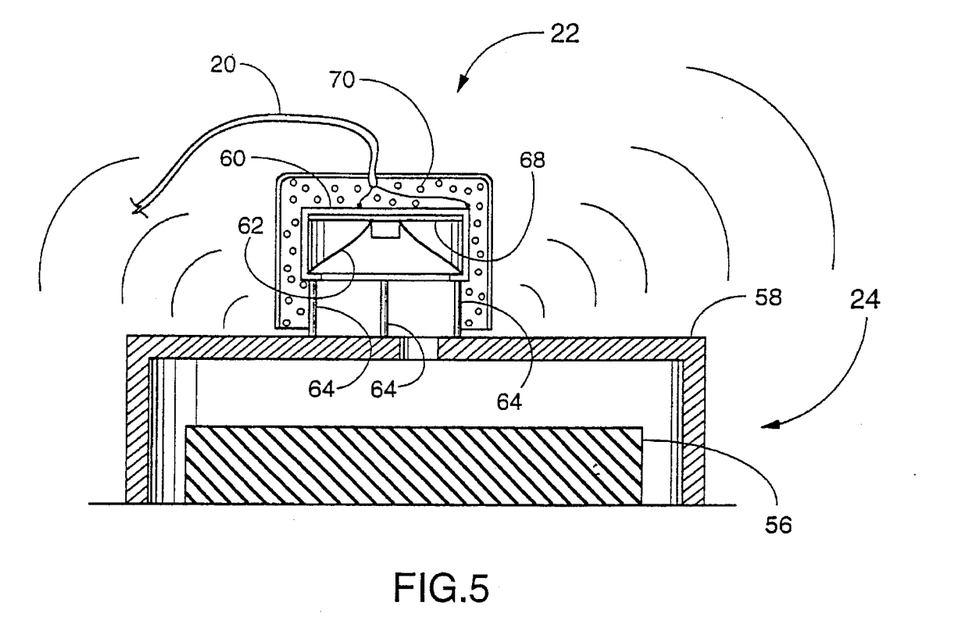
FIG. 5 illustrates a cross-sectional view of the transducer mounted on the handset.

Referring now to FIG. 5, there is illustrated a cross-sectional view of the transducer 22 and the mouthpiece 24. Typically, the mouthpiece is configured as having the pickup 56 disposed within a housing 58. The housing 58 is typically configured to have some type of orifice disposed in the upper surface thereof. While some mouthpieces on telephone handsets appear to have multiple orifices, typically only a single orifice is necessary, this minimizing the amount of space that can allow dirt and debris to be disposed along the pickup 56. Thermal acoustic couplers cover the entire mouthpiece and, as such, it is difficult to talk when the acoustic coupler is engaged. For the purpose of having an acoustical "pickup" for listening to telephone conversations, the earpiece on the handset can typically have an inductive coil disposed about the earpiece. However, this does not work adequately for the purpose of transmitting audio tones in the form of DTMF tones. The present invention utilizes a transducer housing 60 that is disposed such that it has a flat rear surface with cylindrical sidewalls. A membrane speaker 62 is disposed on the interior thereof against the rear surface such that it moves air downward away from the rear surface. The cylindrical sidewalls are disposed away from the surface of the housing 58 with standoffs 64, such that the standoffs 64 do not impede air movement. A coil 68 is provided with the membrane 62 to allow the membrane to be oscillated in response to electrical signals received from the cable 20. This results in sound waves being forced outward along the plane of the housing 58 such that the sound moves over the surface thereof. A protective foam covering 70 is provided which allows the acoustic waves to be transferred therethrough.

Figure 6:
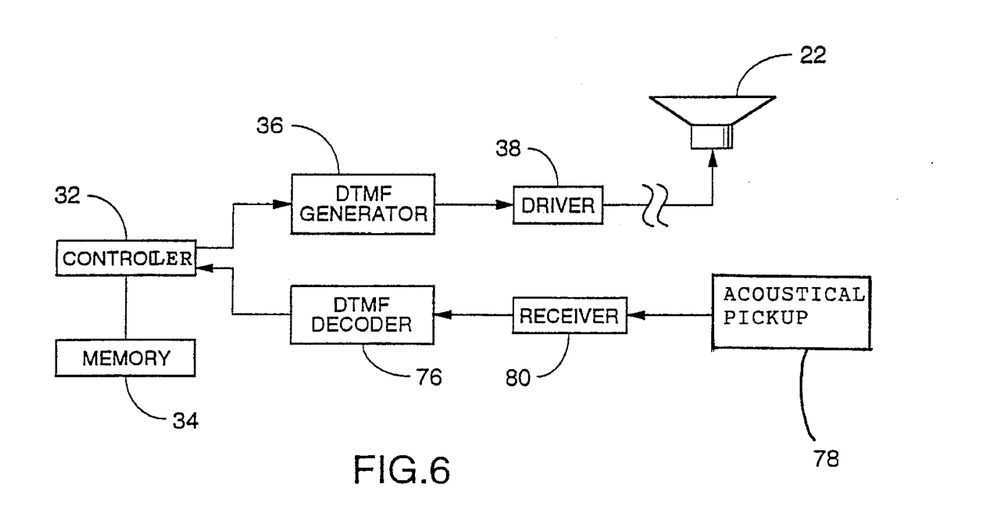
FIG. 6 illustrates a block diagram of an alternate embodiment of the present invention that allows for two-way communication.

Referring now to FIG. 6, there is illustrated a block diagram of the present invention wherein the communications terminal 10 is operable to receive information from the central station. In order for the controller 32 to operate in such a mode, the DTMF decoder 76 is provided which is connected to an acoustical pickup 78 through a receiver 80. The acoustical pickup 78 is typically mounted on the earpiece and can be in the form of a conventional coil that is disposed around the earpiece. These are conventional pickups. The output of the DTMF decoder 76 is input to the controller 32. In operation, the controller 32 is operable to generate tones through the DTMF generator 36 and decode tones from the DTMF decoder 76. In this manner, a two way communication link can be provided to allow the controller 32 a more interactive role with the central station 48.

Figure 7A:
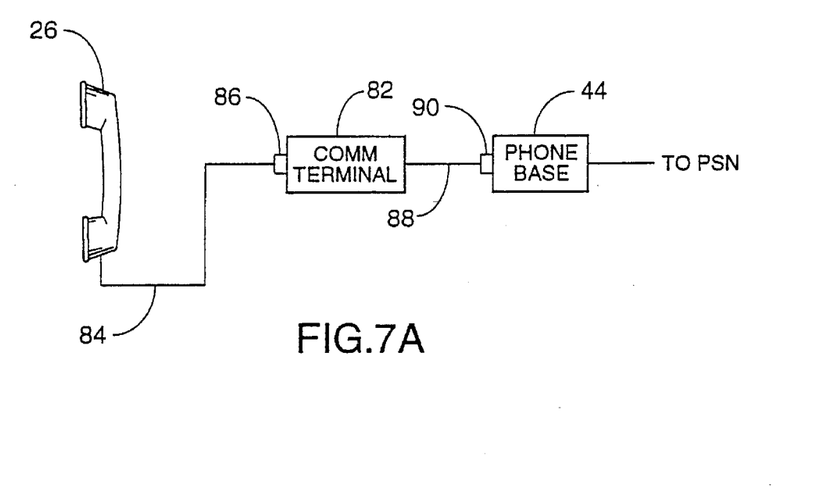
FIGS. 7a–7c illustrate three interconnection schemes of the communications terminal and the phone system.
Figure 7B:
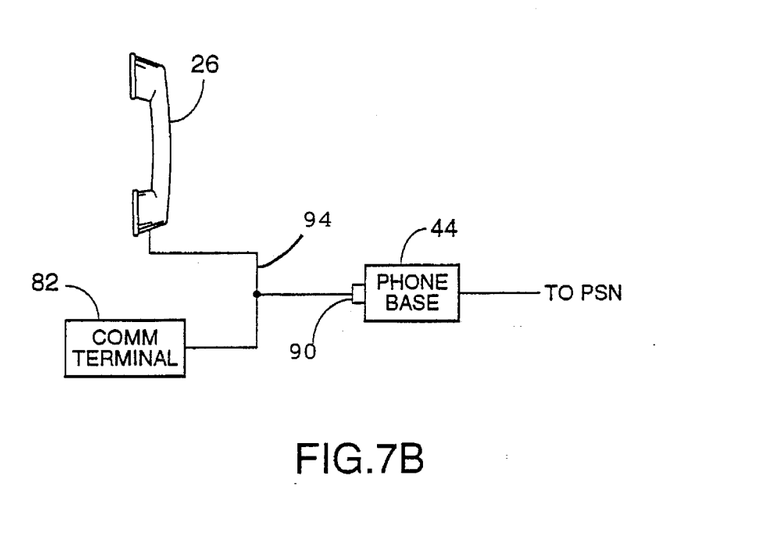
Figure 7C:
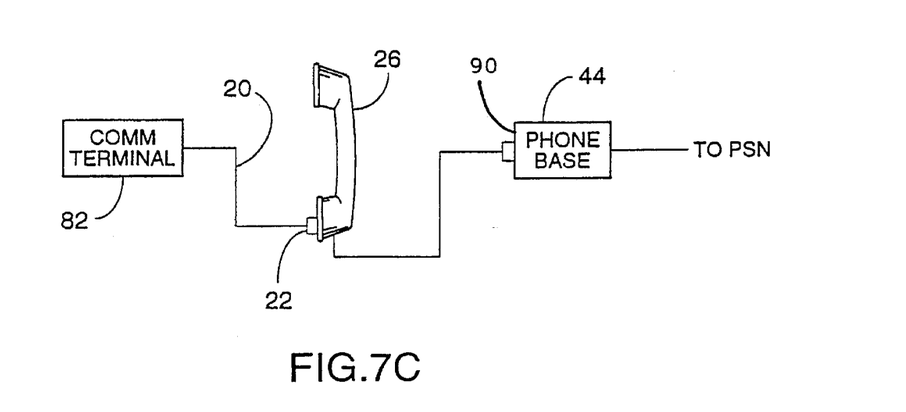

Referring now to FIGS. 7a–7c, there are illustrated three embodiments for the interconnection scheme for the communications terminal. In FIG. 7a, the communications terminal is represented by a reference numeral 82 and the communications terminal 82 is operable to be disposed in series with the handset 26. The handset 26 is connected through a handset cord 84 to a jack 86 on the communications terminal 82. The communications terminal 82 is in turn connected through a cord 88 to a handset jack 90 in the phone base 44. In this mode of operation, the communications terminal 82 is operable to mix the DTMF output therefrom with the signals transferred back and forth along the handset cable. This is a series configuration.

This configuration envisions the integration of the communications terminal 82 into the phone base 44, such that the associated keypad is the keypad 14. Additionally, the keypad 14 could be incorporated into the handset 26.

Referring now to FIG. 7b, there is illustrated an alternate embodiment wherein the communications terminal 82 and the handset 26 share a common handset cable 94 such that the communications terminal can convert the DTMF tones directly to a format compatible to a standard telephone handset input to the phone base 44. The phone base 44 would then interface with the phone line in a conventional manner.

Referring now to FIG. 7c, there is illustrated the preferred configuration described above with respect to FIGS. 1–5.

In operation, the controller 32 is operable to control the DTMF generator 36 to generate a sequence of DTMF tones representing two characters. For example, the letter "A" is represented by the DTMF tones with the number "2" and followed by the DTMF characters for the number "1". Each alpha numeric letter of the alphabet in addition to special characters are coded in this manner. Additionally, each of the characters utilized for the coding scheme are numbers 0–9, "*" and "#", the conventional characters recognized by DTMF decoders. Two coding schemes are provided, one utilizing two separate DTMF codes in a sequence for each of the alpha characters and a single DTMF code for a numeric character, these listed in Table 1. Table 2 illustrates a second coding scheme utilizing fixed length codes such that each alpha character and numeric character requires a sequence of two codes. For example, the character "A" would require DTMF codes for a number "2", followed by a number "1". The character "1" would require a sequence of two DTMF tones, one representing the number "1" and the other representing the number "0".

TABLE I

PRIMARY CODING SCHEME

| CHARACTER | DTMF | CHARACTER | DTMF | CHARACTER | DTMF |
|---|---|---|---|---|---|
| A | 2-1 | N | 6-2 | 1 | 1 |
| B | 2-2 | O | 6-3 | 2 | 2 |
| C | 2-3 | P | 7-1 | 3 | 3 |
| D | 3-1 | Q | 7-7 | 4 | 4 |
| E | 3-2 | R | 7-2 | 5 | 5 |
| F | 3-3 | S | 7-3 | 6 | 6 |
| G | 4-1 | T | 8-1 | 7 | 7 |
| H | 4-2 | U | 8-2 | 8 | 8 |
| I | 4-3 | V | 8-3 | 9 | 9 |
| J | 5-1 | W | 9-1 | 0 | 0 |
| K | 5-2 | X | 9-2 | * | * |
| L | 5-3 | Y | 9-3 | # | # |
| M | 6-1 | Z | 9-9 | | |

TABLE II

SECONDARY CODING SCHEME FIXED LENGTH

| CHARACTER | DTMF | CHARACTER | DTMF | CHARACTER | DTMF |
|---|---|---|---|---|---|
| A | 2-1 | N | 6-2 | 1 | 1-0 |
| B | 2-2 | O | 6-3 | 2 | 2-0 |
| C | 2-3 | P | 7-1 | 3 | 3-0 |
| D | 3-1 | Q | 7-7 | 4 | 4-0 |
| E | 3-2 | R | 7-2 | 5 | 5-0 |
| F | 3-3 | S | 7-3 | 6 | 6-0 |
| G | 4-1 | T | 8-1 | 7 | 7-0 |
| H | 4-2 | U | 8-2 | 8 | 8-0 |
| I | 4-3 | V | 8-3 | 9 | 9-0 |
| J | 5-1 | W | 9-1 | 0 | 0-0 |
| K | 5-2 | X | 9-2 | * | *-0 |
| L | 5-3 | Y | 9-3 | # | #-0 |
| M | 6-1 | Z | 9-9 | | |

The information associated with Table 1 and Table 2 is stored in the memory 34 such that whenever one of the keys on the keypad 14 is depressed, the appropriate DTMF string is looked up in the table and then output with the DTMF generator 36. The "Mode" switch is utilized to select the mode, such that either Table 1 or Table 2 can be utilized. Additionally, there are other tables stored in the memory 34 which can be selected. These tables are learned, as will be described hereinbelow. By selecting an appropriate table, the appropriate characters can be output when a desired one of the keys on keypad 14 are pressed.

In another mode, the Learn mode, the user can associate particular DTMF strings with each key. In the Learn mode, the sequence of steps is as follows:

1. Depress Learn key;
2. Depress desired key;
3. Depress first character in sequence on pad 16;
4. Depress second and subsequent characters in sequence on numeric pad 16; and
5. Depress Learn key again to terminate Learn mode.

With this sequence, an entirely new table can be generated, the only limitation being that the sequence of codes must be identical to those available on the keypad portion 16 of the keypad 14. This is achievable through the use of a learned look-up table that defines each of the keys in keypad portion 16 as being associated with standard DTMF tones associated with the numbers "0" through "9" and the characters "#" and "*". These will be retrieved in step 4.

In summary, there has been provided an interactive voice communications terminal that allows alpha and numeric characters to be output as a sequence of DTMF codes, each DTMF code in the sequence represents a numeric character that is normally generated in a numeric twelve key keypad. A table is provided with the sequences in a portable interactive voice communications terminal. The portable terminal has associated therewith a transducer that can be disposed in proximity to the mouthpiece. By depressing the keys in the desired sequence, each key depression will result in the output of a sequence of DTMF tones associate with that key. These will be decoded at the receiving end on the other side of the telephone system as alpha characters or numeric characters.

Although the preferred embodiment has been described in detail, it should be understood that various changes, substitutions and alterations can be made therein without departing from the spirit and scope of the invention as defined by the appended claims.

What is claimed is:

1. A communication device for allowing a user to communicate with an interactive voice services system through a telephone and an associated communication system, which communication system has associated therewith operating constraints which define the manner in which information is transferred over the communication system, comprising:

a keypad having a plurality of depressible keys each associated with a predetermined character;

a memory for storing a lookup table that defines a predetermined sequence of DTMF tones for each of said keys, said DTMF tones corresponding to a predetermined set of DTMF tones;

a DTMF generating system for generating DTMF tones, said DTMF generating system generating said sequence of DTMF tones associated with a depressed one of said keys, said DTMF generating system operable to buffer said generated sequence of DTMF tones for output in a first-in, first-out format as the sequence is generated and in accordance with the constraints of the communication system;

an interface device for interfacing the output of said DTMF generating system to the communication system without inhibiting the user from speaking into a mouthpiece associated with the telephone such that both voice communication in the form of spoken words by the user and DTMF tone communication can occur at the same time; and a controller operable in response to the depression of one of said keys on said keypad to access said lookup table stored in said memory and the corresponding sequence of DTMF tones and controlling said DTMF generating system to output said accessed sequence of DTMF tones after buffering thereby by said DTMF generating system in said first-in, first-out format, such that said keys can be depressed at a faster rate than said DTMF tones can be generated.

2. The communication device of claim 1 and further comprising a display for displaying visual representations of the DTMF sequence associated with said key after depression thereof.

3. The communication device of claim 1, wherein said controller is operable to control said DTMF generating system to generate said accessed sequence of DTMF tones with substantially no delay.

4. The communication device of claim 1, and further comprising:

a pickup for coupling to the telephone and receiving DTMF tones from the communication system through the telephone;

a DTMF decoder for decoding the received DTMF tones, the received DTMF tones received as a sequence of DTMF tones; and said controller operable in response to decoding of the received sequence of DTMF tones to compare the received sequence of DTMF tones to the sequence of DTMF tones stored in said lookup table and operable to determine which of said corresponding characters is associated with said decoded sequence of DTMF tones, said controller operable to store a representation of the corresponding characters.

5. The communications device of claim 1, wherein the set of DTMF tones is restricted to the twelve DTMF tones generated by a conventional numeric keypad utilized in conjunction with the telephone.

6. The communications system of claim 1, and further comprising:

an alternate input device for inputting characters, said memory having associated therewith in storage an alternate lookup table associated with said alternate input device; and said controller operable to access said alternate lookup table in response to input of characters from said alternate input device and the corresponding sequence of DTMF tones.

7. The communication device of claim 1, wherein said memory is operable to store a plurality of said lookup tables and said controller is operable in response to the depression of select ones of said keys on said keypad to select one of said plurality of lookup tables.

8. The communication device of claim 7, wherein said controller further includes a processor for generating a lookup table for storage in said memory as a learned lookup table, said learned lookup table generated in response to depression of select ones of said keys by the user such that a different sequence of DTMF tones can be associated with at least select ones of said keys on said keypad.

9. The communications device of claim 1, wherein said interface device includes:

a transducer for receiving the output of said DTMF generating system as a driving input and generating acoustic waves corresponding thereto; and said interface device acoustically coupling said transducer to the telephone without inhibiting the user from speaking into the mouthpiece.

10. The communication device of claim 9, wherein the mouthpiece of the telephone has a planar surface and at least one orifice disposed therein for allowing air to pass therethrough and said transducer is operable to direct acoustic waves along the plane of the mouthpiece and disposed such that the at least one orifice is operable to receive the spoken voice of the user, said transducer attached proximate to the planar surface of the mouthpiece.

11. The communication device of claim 1, wherein said keypad is divided into two portions, a first alpha-portion and a second numeric-portion, said characters associated with said keys in said alpha-portion associated with the alphabet and said characters associated with said keys in said numeric-portion associated with the conventional keypad utilized for the telephone.

12. The communication device of claim 11, wherein the sequence of DTMF tones in said lookup table associated with said keys in said numeric-portion are substantially identical to the DTMF tones generated by the conventional telephone keypad, with the remaining keys having a different sequence of DTMF tones.

13. The communication device of claim 11, and further comprising a plurality of keys on said keypad which are disposed in an additional special function portion of said keypad, said special function keys associated with special functions that are not alpha characters or numeric characters.

14. A method for allowing a user to communicate with an interactive voice services system through a telephone having a mouthpiece and an earpiece and an associated communication system, which communication system has associated therewith operating constraints which define the manner in which information is transferred between the telephone and the communication system, with a keypad provided for allowing depression of one of multiple keys, comprising the steps of:

storing a lookup table in a memory that defines a predetermined sequence of DTMF tones for each of the keys on the keypad, each of the keys on the keypad associated with a predetermined character, the DTMF tones corresponding to a predetermined set of DTMF tones;

accessing the lookup table in response to depression of one of the keys on the keypad;

outputting the stored sequence of DTMF tones associated with the depressed one of the keys;

generating DTMF tones associated with the output sequence of DTMF tones from the memory in response to the depression of the one of the keys; buffering the generated sequence of DTMF tones in a first-in, first-out format as the sequence is generated and in accordance with the constraints of the communication system; and coupling the generated DTMF tones to the communication system without inhibiting the user from speaking into the mouthpiece associated with the telephone such that both voice communication in the form of spoken words by the user and DTMF tone communication can occur at the same time and at a rate that can be slower than the rate at which the key is depressed, such that multiple ones of the keys can be depressed in a sequence with the associated predetermined sequence being generated and buffered when the associated key is depressed.

15. The method of claim 14, and further comprising displaying visual representations of the DTMF sequence associated with the depressed key after depression thereof.

16. The method of claim 14, wherein the keypad is divided into two portions, a first alpha-portion and a second numeric-portion, the characters associated with the keys in the alpha-portion associated with the alphabet and the characters associated with the keys in the numeric-portion associated with the conventional keypad utilized for the telephone and wherein:

the step of storing the lookup table in the memory comprises storing a sequence of DTMF tones in the lookup table associated with the keys in the numeric-portion that are identical to the DTMF tones generated by the conventional telephone keypad and storing a different sequence of DTMF tones for the remaining keys in the alpha-portion of the keypad.

17. The method of claim 16, wherein the keypad further comprises a plurality of special function keys that are disposed in an additional special function portion of the keypad and wherein the step of storing the sequence of DTMF tones in the lookup table further comprises storing a sequence of DTMF tones associated with the special function keys.

18. The method of claim 14, wherein the step of storing the lookup table in the memory further comprises storing a plurality of lookup tables in the memory and wherein the step of accessing the memory comprises accessing the memory in response to depression of a select one of the keys to select one of a plurality of lookup tables.

19. The method of claim 18, and further comprising the steps of:

generating a learned lookup table in response to depression of select ones of the keys by the user such that a different sequence of DTMF tones can be associated with an at least select ones of the keys on the keypad; and storing the learned lookup table in the memory such that the lookup table can be accessed in response to depression of an associated select one of the keys on the keypad that is operable to select one of the plurality of lookup tables including the learned lookup table from the memory.

20. The method of claim 14, and further comprising the steps of:

receiving through a transducer the output DTMF tones as a driving input and generating acoustic waves corresponding thereto; and acoustically coupling the transducer to the telephone without inhibiting the user from speaking into the mouthpiece.

21. The method of claim 20, wherein the step of acoustically coupling the transducer to the telephone comprises acoustically coupling the transducer to the mouthpiece on the handset of the telephone.

22. The method of claim 20, wherein the telephone has a planar surface and at least one orifice disposed therein for allowing air to pass therethrough and further comprising directing acoustic waves from the transducer along the surface of the mouthpiece such that the at least one orifice is operable to receive the spoken voice of the user.

\* \* \* \* \*